May 2, 1933.    F. R. WEBB    1,907,162
APPARATUS CAPABLE OF PRODUCING A UNIFORM DISCHARGE OF FLUID
FROM OR AGAINST A VARIABLE HEAD OR PRESSURE
Filed Sept. 18, 1926    3 Sheets-Sheet 1
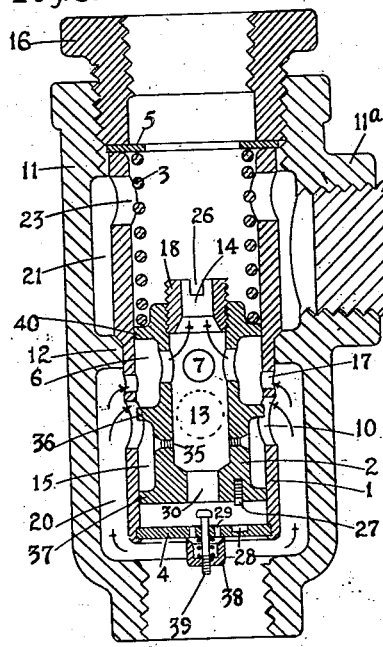
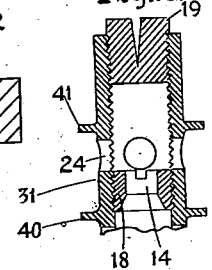
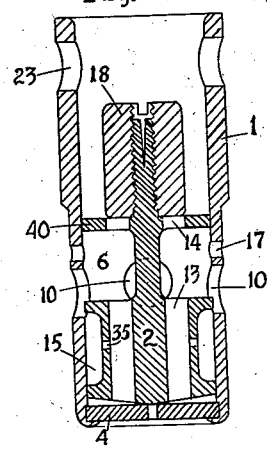
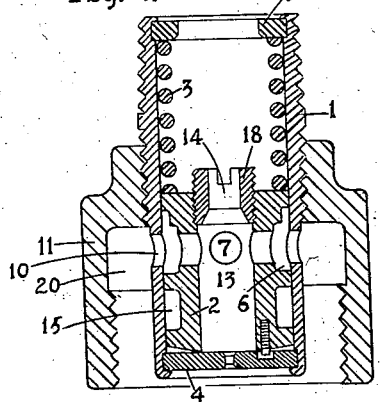
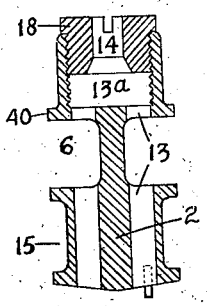
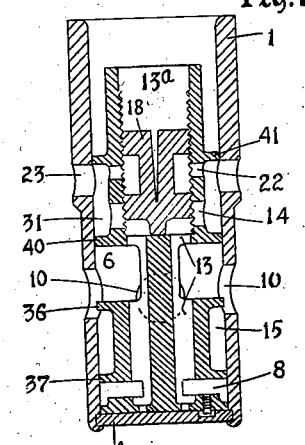
INVENTOR
Frederick R. Webb.

May 2, 1933.  F. R. WEBB  1,907,162
APPARATUS CAPABLE OF PRODUCING A UNIFORM DISCHARGE OF FLUID
FROM OR AGAINST A VARIABLE HEAD OR PRESSURE
Filed Sept. 18, 1926  3 Sheets-Sheet 2
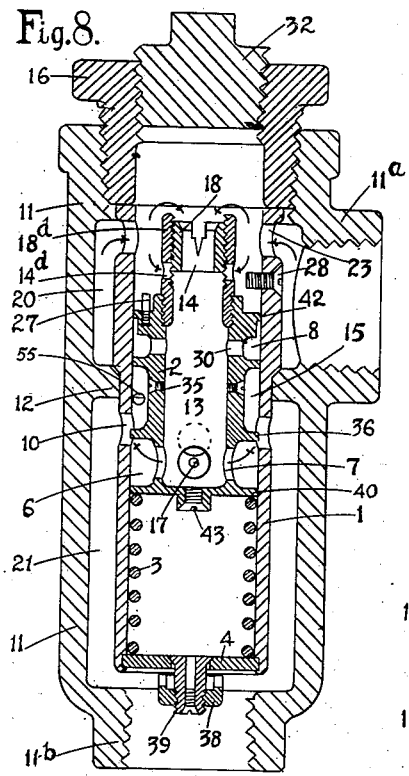
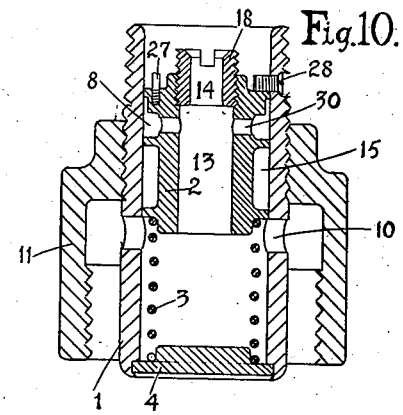
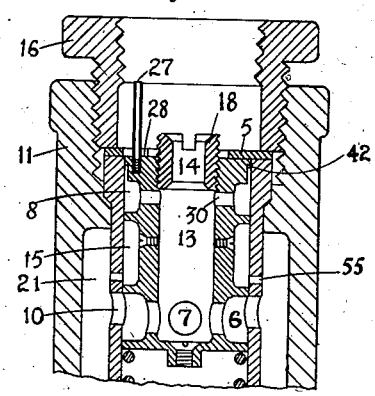
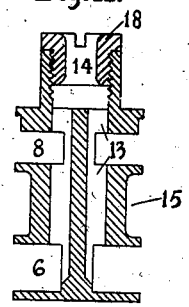
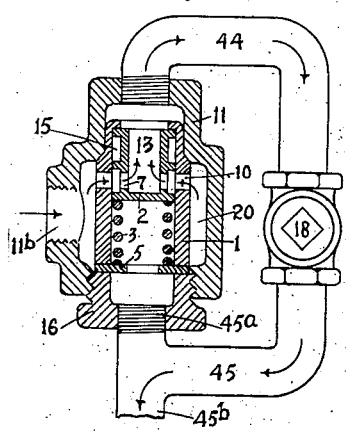
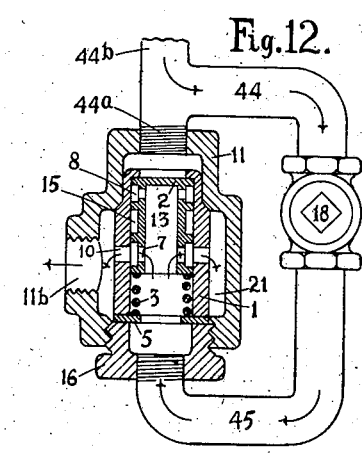
INVENTOR
Frederick R. Webb

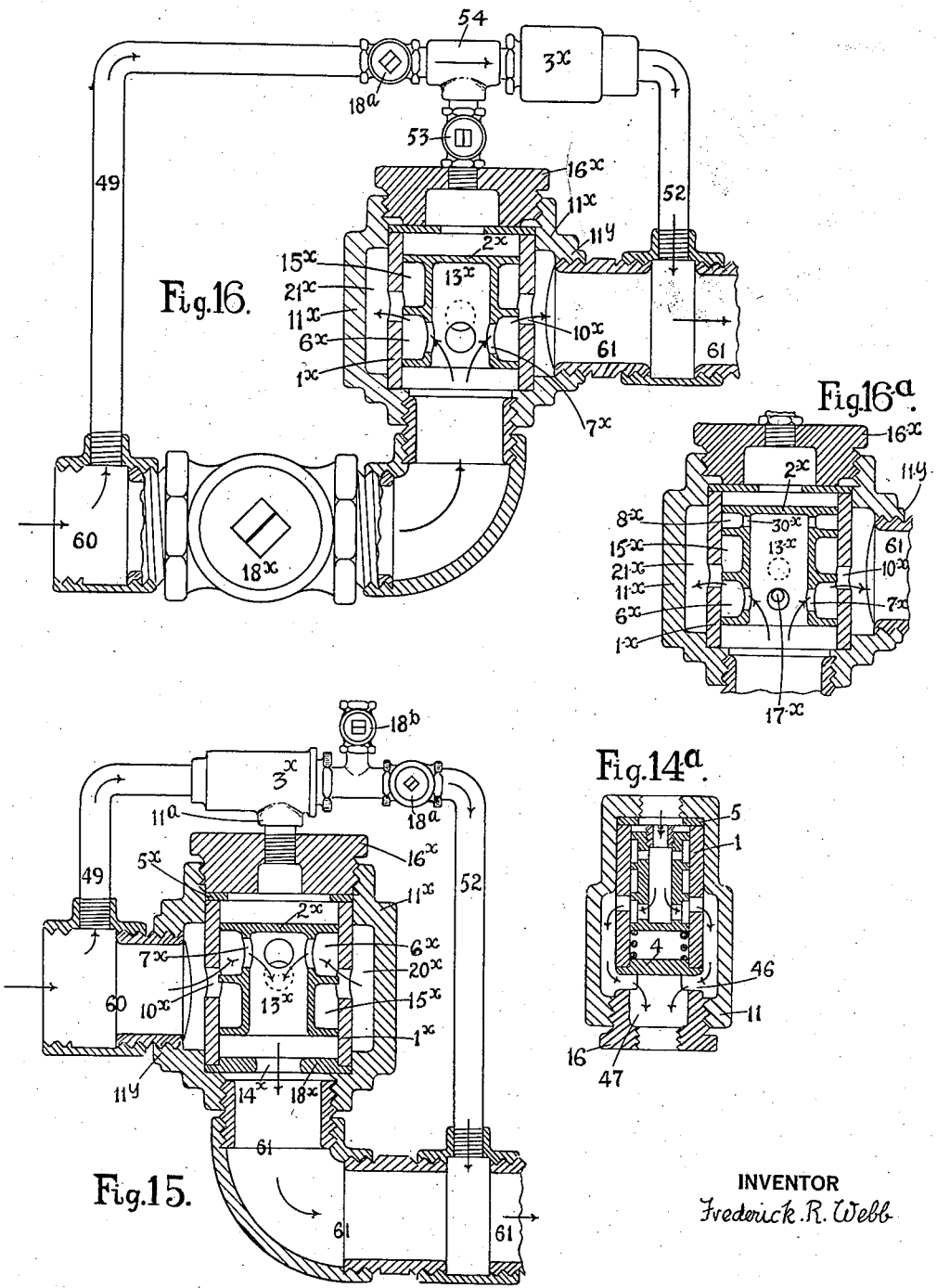

Patented May 2, 1933

1,907,162

UNITED STATES PATENT OFFICE

FREDERICK RICHARD WEBB, OF THAMES-DITTON, ENGLAND

APPARATUS CAPABLE OF PRODUCING A UNIFORM DISCHARGE OF FLUID FROM OR AGAINST A VARIABLE HEAD OR PRESSURE

Application filed September 18, 1926. Serial No. 136,341.

My invention relates to improvements in valves of the nature disclosed in my extinct British Patent No. 24,939—1909, for automatically maintaining a uniform flow of fluid under varying pressures; and the objects of my improvement are to provide a valve for this purpose that is self-contained and simple in its operation, comparatively inexpensive to construct, accurate in its regulation and easily installed in the various capacities in which it may be employed.

I attain these objects by the mechanism illustrated in the accompanying drawings, in which—

Figure 1 is a vertical section of the valve in operation; Fig. 2, a vertical section of the upper end of a modified form of the piston element shown in Fig. 1; Fig. 3, a vertical section of a modified form of the valve for use on systems in which the pressure is not subject to sudden and excessive variations; Fig. 4, a vertical section of another modification of the valve shown at rest, demonstrating a cheaper form of construction; Fig. 5, a vertical section of a modification of the piston element in conjunction with the cylinder element of Fig. 3; Fig. 6, a vertical section of another modification of the piston element suitable for use with the cylinder element of Fig. 3; Fig. 7, a vertical section of a modification of the piston element in conjunction with the cylinder element of Fig. 1; Fig. 8, a vertical section of another modification of the valve, in operation; Fig. 9, a vertical section showing a simplified form of construction of a similar modification at rest; Fig. 10, a vertical section of a simple form of the device constructed of standard parts; Fig. 11, a vertical section of a piston similar to Fig. 6 but suitable for use in Fig. 9; Figures 12 and 13, vertical sections of my device with the resistance elements externalized; Fig. 14 and 14—a, vertical sections of my device showing a particular construction of the clamping element; Figures 15, 16 and 16—a, vertical sections of auxiliary operated valves of the types represented by Figures 1, and 8, respectively.

Similar numerals refer to similar elements throughout the various figures; and the terms "upward", "downward", "right" "left", are used only in relation to the position of the various figures on the sheets.

Referring now to Figure 3, a cylinder 1 is provided in which a piston 2 is free to reciprocate; the lower end of the cylinder is sealed by means of a disc 4, a housing 11 is provided, constructed with a branch 11a, and a central partition 12 bored to receive the lower portion of the cylinder 1 which is of a lesser diameter than its upper portion. The lower end of the housing 11 is arranged for connection to the pipe line preferably as shown and the upper end is arranged to receive a bushing 16, preferably screwed, and of such dimensions, that the bore in the upper end of the housing 11 is sufficiently large to permit passage of the cylinder 1 therethrough. In assembling the device the cylinder is passed downwardly thru the upper bore in housing 11 and through the bore in partition 12 seating on the upper face of partition 12, the cylinder being preferably bevelled from its larger to its smaller diameter portion and the partition preferably recessed, as shown, at its upper face at a suitable angle. The piston 2 is inserted in the cylinder and a spring 3 on top of the piston, a washer 5, preferably of a soft metal or compressible material, being placed on top of the spring; the bushing 16 is then inserted and screwed home compressing spring 3 between washer 5 and the top of piston 2 and finally clamping the cylinder 1 in a fluid tight manner between the said washer and the partition 12.

The piston 2 is formed with an annular recess 6 communicating by means of radial bores 7 with an axial bore or chamber 13, whilst the cylinder 1 is formed with radial bores 10 and 17 communicating between the compartment 20 of the housing 11, and the recess 6 of the piston 2. Another annular recess 15 is preferably formed in the piston for reasons described later. The upper end of axial bore 13 is threaded and a resistance nipple 18, screwed therein, provides communication between the bore 13 and the cylinder space above piston 2. In operation, the fluid (water for example) under pressure passes from the compartment 20 via the radial ports 10 and 17 in cylinder 1, annular recess 6, radial ports 7, axial bore 13 and orifice 14 of nipple 18 to the space above piston 2 and thence through washer 5 and bushing 16 to any desired point, plug 32 closing egress from branch 11a as shown. Arrows indicate the direction of the flow.

In passage the water will obviously exert an upward force (or pull) on piston 2, this upward force however being opposed by the downward force of spring 3 acting on top of the piston, but provided sufficient pressure be present in chamber 20 in excess of that at the upper or discharge end of the system the spring 3 will be overpowered and the piston 2 will rise thereby closing radial ports 10 more or less as regards their communication with annular recess 6, until the discharge thru, and the upward force upon the piston 2 resulting therefrom is so reduced that it is balanced by the downward force of the spring 3. Thus it will be evident that the fluid force acting upwardly on the piston will always be substantially maintained on an equality with the force of the spring opposing it and as a result the fluid pressure per square inch operative between the lower and upper ends of the orifice 14 in nipple 18 will always be substantially the same and invariable provided sufficient pressure be present in compartment 20. Again any desired discharge may be obtained by the provision of an orifice 14 of suitable resistance or bore. The minor ports 17 are dispensed with except under certain conditions on a system, for instance, where the pressure is irregular or vibratory, the closure or exposure effect of the piston on these ports, owing to their smaller area, being obviously less pronounced than that on the major ports 10. The major ports 10 are preferably arranged as follows, one set of ports at one level and another set at a higher level (see dotted circle in Fig. 3). This arrangement ensures a more delicate regulation towards the latter part of the closure movement of piston 2 and avoids the natural tendency of the piston towards vibration at the higher pressures. An annular recess 15 is preferably formed in the piston, and small bores 35 communicating between this recess 15 and the central bore 13 serve to pass a portion of the discharge and thus permit the piston 2 to operate at a higher lever (e. g. on ports 17) than would otherwise be the case. Except in cases, however, in which the valve is in operation at or near its maximum capacity these ports 35 are not employed and are plugged as shown. It will be evident that, since the pressure present in recess 15 approximates that in high pressure compartment 20, there will be a leak upwards, from recess 15 past annular projection or closure-ring 36 of the piston, to recess 6, as also a similar leak downwards, from recess 15 past annular projection or ring 37 of the piston, to the lower cylinder space. The leak to recess 6 joins the main discharge there and passes with it via ports 7 to bore 13 and thence through orifice 14, whilst the leak to the lower cylinder space passes from thence upwards through the piston 2 to axial bore 13 where it joins the main discharge and passes through the orifice 14. Thus these leaks which are unavoidable, since an appreciable clearance between piston 2 and cylinder 1 is imperative to operation, never-the-less do not substantially detract from the uniformity of the net discharge, since they eventually pass through the orifice 14 and thereby add their effect towards closure of the cylinder ports 10 and 17 and resultant throttling of the system.

In practice, I find that, as the pressure in chamber 20 increases so the tendency of the piston 2 towards opening or downward movement is increased to a certain extent. There are various factors contributing to this effect chief amongst which being that the throttling of ports 10 to compensate increased pressure in chamber 20 involves elevation of piston 2 and consequent compression of spring 3 and obviously as the spring is compressed so its pressure and consequent force downwards on the piston is increased. In short the force exerted downwardly on piston 2 by the spring 3, and which operates towards maintaining the valve open against the fluid pressure from chamber 20 is increased as the piston 2 rises.

Obviously of course, this error due to the spring 3 can be minimized by increasing the flexibility of the said spring (i. e.: by increasing the number of coils) or it can be eliminated by substituting an equivalent (e. g.: a weight) for the spring; both these remedies however, involve extra cost and unnecessary unwieldiness in respect of the valve and I preferably attain the necessary correction simply by providing a restricted bore or orifice 30 in the piston 2 communicating between the axial bore 13 and the lower space in cylinder 1, this bore 30 being of such dimensions as will offer a resistance to the passage of the leak, from recess 15 past ring 37, sufficient to produce an increasing upward or closure force on piston 2 as the pressure increases in chamber 20, that will substantially balance the increased downward or opening tendency coincident with this. In this Figure 3 as shown in operation, the entire discharge passes through bushing 16 but by changing the plug 32 from the branch 11a to the bushing 16, the discharge is caused to take place through branch 11a via ports 23 in cylinder 1 and compartment 21 of the housing 11, this latter arrangement being employed when it is required to alter the discharge adjustment from time to time, which can thus be accomplished simply by removal of the plug 32 from the bushing 16 and inserting a nipple 18 of different bore or resistance in the piston 2. In this connection and in order to screw the nipple 18 in or out of its place in piston 2 without dismembering the valve, a pin 27 is provided, fixed in the base of the piston and projecting downwardly therefrom and so placed, that when nipple 18 is turned by means of a screw driver applied to slot 26, and in event of the piston turning as the said nipple is turned, this pin 27 will eventually drop into a small bore or slot 28 formed in the inside of the plate 4 of the cylinder 1, and be held there, thereby checking further rotation of the piston and permitting screwing in or out of the nipple 18 as the case may be.

In cases in which the direction of the discharge through the piston 2 is truly downwards, i. e. gravitationally, (in which case the position of Figure 3 is reversed) and as an added refinement, I provide an air valve to facilitate removal of air trapped in the upper end of cylinder 1, this valve being preferably mounted in the plate 4 as shown and consisting of a headed pin 39 passing outwardly through a central bore in the said plate and screwing into a cap 38 as shown, which, when the main valve is at rest is held apart from the plate 4 by means of a spring compressed between it and the said plate thereby leaving air ports 29 open and free to discharge any air present in the cylinder 1, but, when the main valve is in operation, is forced to seat on plate 4 by the inrushing discharge through the ports 29 which are thereby closed. This arrangement only applies of course to systems controlling a liquid discharge and then is only rarely necessary.

Referring now to Figure 1, and omitting detailed description of the various elements and functions already dealt with in connection with Figure 3 and which are obviously common to both figures, in short the housing 11 with its branch 11a, its partition 12, and its high and low pressure compartments 20 and 21 respectively, the cylinder 1 with its inlet ports 10 and 17 its outlet ports 23, its base plate 4 and so on, the piston with its annular recesses 6 and 15, its ports 7 and 35 and its axial bore 13; the special features now shown are provided to meet abnormal conditions as for instance, sudden and excessive pressure variations, vibratory and irregular feed etcetera; in this connection in addition to the various features already described a dashpot action to choke vibration and steady the piston movement is provided as folows.

The piston 2 is prolonged upwardly and is there constructed with a third annular recess 31 bounded at its lower end by the annular projection or ring 40 (also shown in Fig. 3) and at its upper end by an annular projection or ring 41; the uppermost end of the piston being reduced in diameter for a pre-determined depth above the upper face of ring 41 so as to leave ample space for the spring 3 which is compressed between the washer 5 and the said ring, the said washer being held to the cylinder end under pressure of the spring 48. The axial bore 13 is continued upwardly the entire length of the piston and is threaded at its upper end to admit a specially constructed plug 18. Radial resistance ports 14 are provided communicating between bore 13 and annular recess 31 whilst the radial bores 23 in the cylinder walls form communication between recess 31 and the low pressure compartment 21 of the housing 11.

The above mentioned construction provides a dashpot consisting in that part of cylinder 1 situated above ring 41 of piston 2 whilst the upper end of piston 2 operates as the plunger. In extreme cases, a second dashpot action is also provided in the base of cylinder 1 as follows; the piston 2 is constructed at its lower end with a fourth annular recess 8 communicating via radial ports 30 with the central bore 13 which terminates as shown at a short distance from the base of the piston 2. This construction provides a solid base to the piston 2 which can then operate as a plunger, in the lower end of cylinder 1 which functions as the dashpot. A small bore 30$^a$ is preferably formed in the base of the piston which in conjunction with a small air valve or bore 29 serves to eliminate air trapped in the system.

In operation, plug 32 being firmly screwed into bushing 16, the fluid, water for example, passes from high pressure compartment 20 in the direction shown by arrows, i. e.: via ports 10 and 17 to recess 6 and thence via radial ports 7, axial bore 13, radial resistance orifices 14, annular recess 31 and radial ports 23 to low pressure compartment 21 and thence to any desired destination via the branch 11$^a$.

The function of plug 18, already referred to and which screws into the upper end of bore 13, is to adjust the degree of exposure, i. e.: resistance, of the orifices 14, and by screwing this plug up or down, as the case may be, the degree of resistance to the passage of the fluid offered by the said orifices may be diminished or increased at will and a greater or lesser discharge thereby produced, since, as already explained, the spring 3 functions to maintain a substantially constant difference of pressure between the ingress and egress sides of these resistance orifices 14. An annular recess 25 is formed in plug 18 and so arranged that, when the plug is positioned either so as to provide complete exposure or closure of the resistance orifices 14, the said recess 25 is in communication via ports 22 with the annular recess 31. This arrangement enables any leakage upwards from the space in bore 13 beneath the plug 18 to discharge via the ports 22, otherwise such leakage would discharge to a certain extent into the cylinder space above the ring 41 and by so doing augment the fluid pressure therein and the resultant force therefrom operating downwardly upon the piston 2.

This plug 18 is preferably split at its upper end and expanded as shown so as to offer some outward pressure and enable it thereby to maintain its position when adjusted as with frequent manipulations, it is liable to acquire too much lateral play.

The portion of piston 2 projecting upwardly above ring 41 is preferably so arranged as to afford a check on any excessive movement of the piston, by abutting against the washer 5 at a predetermined stroke. This arrangement, in addition to absolutely precluding any possibility of an overreachment of the ports 10 or 23 by the rings 37 or 40 respectively, also protects the spring 3 from undue strain.

Regarding the leaks from recess 15 already described in connection with Fig. 3, while the upward leak is as before described, the downward leak past ring 37, in the present case enters annular recess 8 and thence passes via radial ports 30 to bore 13, the fluid in recess 8 being preferably maintained at a somewhat higher pressure than that in bore 13 by suitable restriction in the capacity of the bores 30, provides for a slight and gradual increase of pressure operative upwardly upon the piston-base due to increased leakage as the pressure in compartment 20 rises and the piston moves upwards, the object of this provision being as before described to compensate for the increasing downward pressure exerted by the spring 3 as its compression is intensified. Screw plug 33 inserted in main plug 32 affords a simple means for removing air trapped above piston 2 and which would render the dashpot action ineffective at this point. If desired an air valve similar to that shown in Fig. 3 may be substituted for plug 32.

In Fig. 2 is shown an arrangement whereby, whilst preserving the upper dashpot action described in connection with Fig. 1, the employment of interchangeable resistance nipples as described in connection with Fig. 3, is rendered possible. The upper end of axial bore 13 is threaded as shown whilst the nipple 18 is screwed sufficiently down in the said bore to clear radial ports 24 which communicate between recess 31 and the space in bore 13 above the said resistance nipple 18, a plug 19 screwed into the top of bore 13, after insertion of the nipple 18, preserves the dashpot effect. The discharge takes place through resistance orifice 14 and via radial ports 24 to recess 31 (see Fig. 1) and thence via radial ports 23 as before described.

In Fig. 4 is shown a simple form of construction largely from standard parts and suitable for use under favorable conditions and where complete accuracy is not an essential. The cylinder 1 consists in a length of standard piping, preferably brass, reduced in diameter at its lower end so as to pass through the threads in a standard reducing coupling 11. The central external portion of the cylinder is threaded suitably, as shown, to screw into the said coupling and form a fluid-tight joint therewith, whilst the upper end of the said cylinder, is similarly screwed for connection to the discharge system. The bore of the cylinder 1 is reamed out to a diameter somewhat greater than the normal bore at a point almost at its uppermost end, a washer 5 of a diameter approximating the enlarged bore of the cylinder and greater than that of the normal bore is passed up and held as shown near the top of the cylinder, the spring 3 being compressed between this washer 5 and the piston 2 (which is preferably constructed from standard piping of a smaller size than cylinder 1) and which possesses similar features to those described in connection with Fig. 3. The lower end of the bore of cylinder 1 is recessed to accommodate a disc 4, this disc being inserted beneath the piston 2, the lower rim of the cylinder 1 being spun or turned over to hold the disc 4 in place and the joint preferably soldered. An air-escape bore 29 is provided in the disc 4 under certain conditions. A similar resistance nipple 18 to that shown in Fig. 3 is provided; cylinder ports 17 and piston ports 35 as also restricted passage 30 in piston 2, are dispensed with.

In Fig. 5, the piston 2, which is designed for use in the cylinder element of Fig. 3, whilst operating substantially on the same lines as already described and embodying the same general features, is nevertheless somewhat different in detail. As regards the annular recesses 6 and 15, in form and function they are the same as their counterparts in Fig. 3. Two or more vertical bores 13, which are intersected and broken into by the annular recess 6, take the place of axial bore 13 of Fig. 3, and this construction, as shown, eliminates the necessity for radial ports 7 of Fig. 3, thereby providing a less restricted passage for the fluid in its travel from ports 10 and 17 to the resistance orifices 14 (shown closed) and which consist in reality, in the upper ends of the aforementioned vertical bores 13 where they pass through the annular projection or ring 40. Above ring 40 the piston is reduced to such a diameter as will clear the inside circle of the bores 14. This leaves a pin-like projection of the piston body, above the said ring, which is threaded and split to accommodate and retain a thimble 18 adapted to screw thereon as shown and which, by adjustment up or down, serves to increase or diminish the conductance of the resistance orifices 14.

In Fig. 6, is shown a piston of similar construction to that of Fig. 5, but arranged to accommodate an interchangeable resistance nipple in place of the adjustable resistance orifices 14 of Fig. 5. Above ring 40 the piston diameter is reduced sufficiently to accommodate the spring 3, which acts upon the upper face of the said ring 40. In this upper portion of the piston an axial bore 13ª is formed of sufficient diameter to extend outwardly beyond the bores 13 which pass through the ring 40. The bore 13ª is threaded to accommodate an interchangeable resistance nipple 18 as shown.

In Fig. 7 is shown a similar form of piston to that shown in Fig. 6, but with the various added features possessed by the piston shown in Fig. 1 and suitable for use in the cylinder element of Fig. 1. As regards construction, the vertical bores 13 here shown, whilst similar to those of Fig. 6, are not continued downwardly the entire depth of the piston, but terminate shortly before reaching its lower end. Annular recesses 6, 15 and 8 are similar in form and function to their corresponding numbers in Fig. 1, recesses 6 and 8 being of such depth as to intersect the vertical bores 13 and thereby do away with the necessity for employment of the ports 7 and 30. The upper portion of piston 2 is formed externally as regards ring 40, recess 31, ring 41, etc. as in Fig. 1, an axial bore "13a" is formed as in Fig. 6 and threaded as shown to accommodate a plug 18 similar in construction to that shown in Fig. 1, and arranged to control closure and exposure of radial resistance orifices 14 which effect communication between the upper ends of vertical bores 13 and annular recess 31. Plug 18 is preferably formed with a projection at its base adapted to abut against the base of the bore 13a as the plug 18 is screwed downwardly and just prior to or at closure of the resistance orifices 14, thus preventing unnecessary downward adjustment of the said plug.

In operation the main discharge takes place through ports 10 to recess 6 and thence via upper ends of vertical bores 13, and resistance orifices 14, to recess 31 and thence via ports 23. The leak discharges from annular recess 15 upwardly past ring 36 to recess 6 and thence with the main discharge, and downwardly from annular recess 15, past ring 37 to recess 8 and, thence via lower portions of bores 13 to recess 6 and thence with the main discharge.

When controlling a gaseous fluid under such conditions that a steadying influence is required to prevent vibrations of the piston 2, the position of the device is reversed from that shown in the drawings (see Figs. 1 and 7) and oil or the like, fed into the lower end of cylinder 1, through a U-tube connection substituted for plug 33, to a level approximating that of the ports 23, acts as the medium for the dashpot effect. That end of the U-tube to which the oil is fed is preferably at a higher level than that of the ports 23 and a suitable cock is provided on the tube which is kept normally closed.

In Figures 8, 9 and 10, are shown modifications of my device in which the throttling action of the piston 2 upon the ports 10 of the cylinder 1 is exercised from within the said cylinder which is normally maintained, as regards its interior, at a substantially higher pressure than the compartment 21 (or the housing 11) with which the ports 10 communicate.

Referring specifically to Fig. 8: In operation, the fluid (e. g.; water) enters the compartment 20 of the housing 11 via the branch 11—a, and passes thence via ports 23, fixed orifice 14 of nipple 18 and radial adjustable orifices 14—d of bushing 18—d, to the axial bore 13 of the piston 2, and thence via ports 7, annular recess 6, and ports 10 and 17, to the low-pressure compartment 21, and thence via the branch 11—b to its required destination. Arrows indicate the direction of the discharge. In passage the water exerts a downward force on piston 2 which is opposed by the upward force of the spring 3 (compressed between the lower end of piston 2 and the disc 4 which seals the lower end of cylinder 1); and, provided sufficient pressure be present in compartment 20 in excess of that in compartment 21, the spring will be overpowered and the piston 2 will be forced downwards thereby closing ports 10 more or less until the discharge through, and the resultant downward force upon the piston 2 is so reduced that it is balanced by the upward force of the spring 3, and thus as already described in connection with Fig. 3, a substantially constant pressure is maintained between the ingress and egress ends of the resistance orifices 14 and 14—d, and a correspondingly uniform discharge thereby produced; also any desired discharge can be obtained by screw adjustment of the nipple 18 in the bushing 18—d, by which means the degree of exposure of the radial resistance orifices 14—d, is regulated, the nipple 18 being split and expanded as shown to enable it to maintain its position in the bushing 18—d. The function of annular recess 8 and radial ports 30 is best explained by assuming their absence in the first place, and under these conditions it will be clear that a leak will occur from the high-pressure fluid present in the upper end of cylinder 1, around the upper end of piston 2 to annular recess 15 which communicates with the low-pressure compartment 21 of the housing. This leak will vary as the difference in pressure between the compartments 20 and 21 varies and will thus produce a considerable error in the resulting discharge from the device, dependent upon the amount of clearance permitted the piston.

In the construction shown however, this leak takes place from annular recess 8 which is substantially fed, by means of radial ports 30, from the axial bore 13; in other words the major portion of this leak passes primarily through the resistance orifices 14 and 14—d and thus contributes to the closure effect upon the piston 2. Furthermore, provided that the ports 30 possess ample conductance for the purpose assigned them, it may be assumed that a uniform difference of pressure is maintained between the fluid above the ring 42 and that in recess 8 and as a result that a constant and uniform discharge takes place at all times to the recess 8 around the said ring 42. By employing the construction shown in Fig. 8 it will thus be evident that any irregularity in the uniformity of the discharge due to the aforementioned leak is, to all intents and purposes, eliminated. The arrangement and functions of the radial ports 10 and 17 of the cylinder 1 are similar to those already described in detail in connection with Fig. 3. Relief ports 35 also perform a similar function to those in Fig. 3, i. e.: being normally plugged and inoperative as shown, but in cases where the valve functions at or near its maximum capacity, serving to pass a portion of the discharge, thereby relieving the major ports 10 and enabling the piston to operate the ports 17 at the higher pressures. Adjustments are effected by removal of the plug 32 and screw manipulation of the nipple 18 to vary the exposure of the radial resistance orifices 14—d. Where a greater variation of the discharge is required than can be accomplished in this manner, the existent nipple 18 is exchanged for one of a different bore. Also it will be clear that a simple interchangeable nipple as employed in Fig. 3, may be substituted for the bushing 18—d and its accessories. In order to facilitate screw manipulation of the nipple 18 a check pin 27 is provided fixed in the upper end of piston 2 and adapted to abut against another pin or screw 28, fixed at right angles to it in the wall of cylinder 1, thus checking rotation of the piston when the nipple 18 is being turned. Obviously the bushing 18—d may be replaced by a prolongation of the piston 2 upwardly, such prolongation possessing similar characteristics to the said bushing. As regards this Fig. 8, the lower end of the cylinder 1 functions as a dash-pot to steady the piston movements, and under conditions in which the direction of the discharge through the piston is truly upwards (in which case the position of Fig. 8, is reversed) I provide an air-valve to effect removal of air trapped in the dash-pot. This air valve consists in a headed pin 39 passing loosely through a bore in the plate 4 and screwing into a cap 38 as shown; when the device is at rest the air valve descends by its own weight permitting discharge of air through the annular clearance around pin 39 and thence via slots shown in the base of the cap 38, but when the device is in operation the pressure within the cylinder forces the headed pin 39 to seat in plate 4 thus closing communication to the outside of cylinder 1.

When controlling a gaseous fluid under conditions that necessitate a steadying influence; the air-valve and ports in plate 4 are dispensed with and the construction of the piston 2 is such that the annular projection 40 is positioned at a considerably greater depth below the ports 7 than that shown in Fig. 8, so as to permit of the presence of oil, or the like, in the lower portion of the cylinder 1, without danger of the piston, in its lowest position, submerging the ports 7 and thereby impeding the egress of the gaseous fluid from axial bore 13 through the said ports. In order to facilitate replenishment of the oil to the lower end of the cylinder the screw plug 43 is removed and a valve, similar to the air-valve shown in this figure but reversed in position, is provided in substitution for the said plug. Oil or the like is then replenished via nipple 18, bore 13 and past the said valve.

Fig. 9 shows a simplification of the housing 11 from that hitherto described in connection with Figures 3 and 8. The branch 11—a is dispensed with, and as a consequence the said housing 11 embodies one chamber only in place of two. A bore is formed through the upper portion of the housing to the chambered portion thereof of suitable diameter to permit passage therethrough of the smaller diameter portion of the cylinder 1. The upper portion of the said bore is enlarged sufficiently to permit passage of the larger diameter portion of the cylinder there-through and a recess or seat is formed at the base of this larger bore, where it joins the smaller, at a suitable angle to accommodate the bevelled portion of the cylinder 1. The larger diameter portion of the bore is tapped to receive the bushing 16 which functions as before to clamp the cylinder 1 firmly on its seat. As regards the cylinder 1, ports 23 are dispensed with and as regards the piston a simple interchangeable nipple 18 is preferably employed. The piston and cylinder shown in Fig. 9, are similar to those shown in Fig. 8; in this case however a slot 28 formed in the washer 5, and through which the check-pin 27 passes, is substituted for the screw 28 shown in Fig. 8. The lower portion of housing 11 (not shown) is similar to that shown in Fig. 3, or Fig. 8.

Fig. 10 shows a simplified form of construction of the modification of my device exemplified in Fig. 8. The cylinder 1 consists in a piece of standard piping, preferably brass, suitably threaded at its upper end as shown to screw into a reducing coupling 11. The threaded portion of the cylinder 1 extends sufficiently above the coupling 11 to permit of connection to the service main. Radial bores 10 in cylinder 1 serve the same purpose as that already described. The piston 2 which is preferably constructed of standard tubing is provided with an annular recess 8, radial bores 30, axial bore 13 and annular recess 15 all functioning as in Fig. 8. An interchangeable resistance nipple 18 is provided. The spring 3 seats at its upper end around a projection of the piston 2 and at its lower end around a similar projection of the plate 4, this arrangement avoids contact of the end of the spring with the edges of bores 10 which is liable to cause sticking. The plate 4 is sealed in the lower end of cylinder 1, as in Fig. 8. Annular recess 6 is dispensed with the discharge taking place from axial bore 13, through the coils of the spring to radial ports 10. When discharging against a pressure, connection is made by nipple or bushing to the lower end of coupling 11; but when discharging a liquid into a storage tank, for instance, and provided such discharge takes place below the water level so that splashing is avoided it is clear that the coupling 11 may be dispensed with.

Fig. 11 shows a piston of similar type to that shown in Fig. 6, but suitable for operation in the cylinder shown in Fig. 9. When operating in the said cylinder the various elements (e. g.: nipple 18, bores 13, recesses 8, 15 and 6) perform the same functions as their corresponding numbers in the Figures 8, 9 and 10.

Fig. 12 shows a modification of the form shown in Fig. 9, in which the resistance 18 is externalized as regards the piston 2, also the position of the bushing 16 is reversed from that shown in Fig. 9, the cylinder 1 being seated within the chamber 21 and at the upper end thereof. The space shown in the housing 11 above the cylinder 1 is maintained at the full service pressure, via branch 44a of the conduit 44, and a bore through the upper end of cylinder 1 places the upper end of piston 2 under the same pressure. Arrows indicate the direction of the discharge which is by-passed, via conduit 44, adjustable resistance valve 18, and conduit 45, from the upper to the lower end of the housing 11, passing via bushing 16 and the bore in plate 5 to the interior of the cylinder 1 and the piston 2, and thence via ports 7 and 10 to chamber 21 and out of the housing via branch 11—b. As already explained equilibrium will be obtained as soon as the fluid pressure acting on top of the piston 2 balances the spring pressure plus the fluid pressure acting on the other end of the said piston, and the piston 2 will operate to expose the ports 10 sufficiently to obtain this equilibrium. As a consequence, it will be clear that by this means a constant difference of pressure is maintained between the upper and lower ends of the resistance valve 18, and that by adjustment of the said valve a uniform discharge of fluid of any desired volume, within reason, may be obtained therethrough.

Fig. 13 shows a similar by-passing modification of the type of my device shown in Fig. 3. The arrangement of the housing 11, cylinder 1 and bushing 16 are similar to that of Fig. 12 but the discharge through radial control ports 10 is inward. Arrows indicate the direction of the discharge. The chamber 20 is maintained substantially at the feed pressure by means of branch 11—b which is connected to the service main. The fluid enters cylinder 1 by radial ports 10 passing via ports 7, axial chamber 13 and a bore in the upper end of cylinder 1, out of the housing 11 and through conduit 44, connected to the upper end thereof, to adjustable resistance valve 18 and through the said valve to conduit 45 communicating, by means of branch 45—a, with the lower end of piston 2 via bushing 16 and the bore in plate 5; and by means of branch 45—b, with the point at which the uniform discharge is required. Equilibrium will be obtained as soon as the fluid pressure above the piston 2 balances the spring pressure plus the fluid pressure acting upwardly on the said piston; and the piston will operate to expose ports 10 sufficiently to obtain this equilibrium, which will provide a constant difference of pressure, between the upper and lower ends of adjustable resistance valve 18, amounting substantially to the force of spring 3 divided by the area of piston 2; and thus by adjustment of the said valve a uniform discharge of fluid of any desired volume within reason may be obtained therethrough.

Figures 14 and 14—a relate primarily to a modified form of construction of the bushing 16 which is here arranged to project considerably into the interior or chambered portion of housing 11. Slots 46 formed in this projecting portion as shown, (or radial bores) provide passage for the discharge (as shown by arrows) between the said bushing 16 and this end of cylinder 1. The said end is solid as shown and preferably in the form of a cap 4, seating in a fluid tight manner on the cylinder end and with its innermost portion arranged to project thereinto. In assembling the various elements, the bushing 16 being removed, the washer 5 is inserted through the bore in this end of the housing; the cylinder 1, with its internal elements and the cap 4 as shown, is then passed through the said bore, and the bushing 16 then inserted and screwed firmly home forcing the cylinder 1 on to its seating in a fluid-tight manner. A spring of considerable strength (see 48 Fig. 1,) within the chambered portion 47 of the bushing 16, is preferably employed, compressed between the bushing and the cap 4 and so arranged that sufficient conductance is permitted for the discharge radially through its coils. By this means it will be obvious that the necessity for accuracy in the thread-taper of the screwed bushing 16, necessary to obtain a fluid-tight joint between it and the housing 11 is avoided. The slotted construction of the bushing 16 here shown, in Figures 14 and 14—a, is applicable also to Fig. 1, and preferably employed in cases in which easy access for adjustment of the discharge is not of paramount importance, and in this case branch 11—a of the housing 11 may obviously be dispensed with, the egress discharge taking place through bushing 16, whilst the advantage of the upper dash pot construction of the cylinder 1 is preserved since the solid cap 4 is substituted for the bored plate 5 shown in Fig. 1.

In Fig. 15, is shown a comparatively large valve of the type depicted in Fig. 1, (i. e.: "radial-feed"), auxiliary-operated by a smaller valve of the same type. The main-cylinder 1—$x$ passes through the bushing-bore in housing 11—$x$ and seats in the lower end of the chamber 20—$x$ a cap 18—$x$, with a resistance-orifice 14—$x$ therethrough, terminating this end of the cylinder 1—$x$. A piston 2—$x$ is inserted in the said cylinder and the bushing 16—$x$ is screwed down on the washer 5—$x$ clamping the cylinder 1—$x$ in a fluid-tight manner into the interior of housing 11—$x$. A branch 11—$y$ of the housing, communicating on the one hand with the chamber 20—$x$ and on the other with the feed conduit 60, places the said chamber under the feed pressure.

The auxiliary-valve 3—$x$ (e. g.: of the type shown in Fig. 3,) is placed in communication (e. g.: by means of its branch 11—$a$) via the bushing 16—$x$ and the bore in washer 5—$x$ with the upper end of piston 2—$x$ which is solid as shown. The inlet end of valve 3—$x$ communicates via conduit 49 with the feed-conduit 60 as shown, whilst the outlet end of valve 3—$x$ communicates via auxiliary-resistance-valve 18—$a$ and conduit 52 with the main discharge-conduit 61. The device is shown in operation and arrows indicate the flow of fluid. The auxiliary (or minor) discharge indicated, through the valve 3—$x$, (the resistance valve 18—$a$ being set at a predetermined opening) produces a predetermined and substantially invariable difference of pressure between the compartment 21 (see Fig. 3) of valve 3—$x$ and conduit 52, and since the said compartment of valve 3—$x$ communicates freely via branch 11—$a$ with the upper space in main cylinder 1—$x$, and since the said conduit 52 communicates freely with the main discharge conduit, it follows that an invariable difference in pressure is substantially maintained between the fluid in cylinder 1—$x$ above piston 2—$x$ and the fluid below the orifice 14—$x$. In short the combination of valves 3—$x$ and 18—$a$ provides a pressure reducing device for maintaining an invariable effective pressure operative downwardly upon the piston 2—$x$. Again the main discharge of fluid indicated enters the cylinder 1—$x$ through ports 10—$x$ and passes via recess 6—$x$, ports 7—$x$, and central chamber 13—$x$ of the piston 2—$x$ and via resistance orifice 14—$x$ to the discharge conduit 61. Increase of the feed pressure produces a temporary excessive discharge through ports 10—$x$ and orifice 14—$x$ and as a result a temporary excess pressure in cylinder 1—$x$ below piston 2—$x$ over that above the said piston which will rise, as a consequence, closing ports 10—$x$ until the pressure above and below it is substantially equalized. It will also be clear that a reduction in the pressure at the discharge end of the system will produce a similar unbalancing of, and correction by, the piston 2—$x$; since such reduction will cause a corresponding decrease in pressure at the discharge end of valve 3—$x$ and in the pressure operative on top of piston 2—$x$. Also it will be clear that the reverse occurs when a decrease of feed pressure or an increase of discharge pressure takes place, the piston 2—$x$ then, in order to produce equalization of the pressures above and below it, operating to open the ports 10—$x$. Thus an invariable discharge by-passed through the tained between the upper and lower ends of resistance orifice 14—$x$ resulting in an invariable discharge of fluid therethrough and this main discharge plus the auxiliary invariable discharge by-passed through the valve 3—$x$, constitutes the total invariable discharge from the apparatus. An adjustable resistance valve, inserted in the main discharge conduit 61 at any point between the base of cylinder 1—$x$ and the discharge end of conduit 52, may obviously be substituted for resistance cap 18—$x$ with its restricted orifice 14—$x$. Again any one of the various designs of my uniform discharge valves Figures 1 to 14—a may be employed in the auxiliary capacity.

Again referring to Fig. 15, if it be necessary to produce a varying number of constant discharges (e. g.: to atmosphere or against constant pressures) at predetermined points; the valve 18—a is closed and the resistance-valve 18—b which communicates between the valve 3—x and a constant pressure, (e. g.: the atmosphere), is opened to a predetermined degree. The resistance cap 18—x is dispensed with, the cylinder 1—x seating in a fluid-tight manner, either directly or on a suitable washer, in the base of chamber 20—x; the interior of the cylinder at this end communicating freely with the discharge conduit 61. In operation the small primary discharge (from feed conduit 60 via uniform discharge valve 3—x, and resistance-valve 18—b to atmosphere) produces a predetermined constant pressure in the compartment 21 (see Fig. 3,) of the uniform discharge valve 3—x and thus the combination of the valves 3—x and 18—b becomes a pressure reducing device for maintaining a constant downward pressure, via branch 11—a, on the piston 2—x. And assuming, for example, two different points, in the discharge conduit 61, at which invariable discharges are required, with a resistance-orifice or an adjustable resistance-valve at each; as before described, a variation of pressure in feed conduit 60 produces a momentary and similar variation of pressure on the resistance orifice which is corrected by the balancing operation of the piston 2—x until the pressure acting upon the resistance orifice is proportioned to the pressure acting downwardly on the piston. Since in this case the pressure acting downwardly on the piston 2—x is invariable it follows that the pressure maintained by the operation of the said piston is also invariable and as the aforementioned orifices discharge against a constant pressure it follows that their respective discharges will be constant. Also if it be necessary to vary the number of the said discharges (e. g.: by shutting off one of them) the pressure in discharge conduit 61 will rise momentarily and the piston 2—x will adjust exposure of the ports 10—x until the pressure in conduit 61 is again proportional to the invariable pressure acting downwardly on the piston and thus the remaining resistance orifice or valve will continue to produce its invariable discharge. Obviously I may employ any known type of pressure-reducing-device with its high-pressure terminal communicating with feed-conduit 60, and its low pressure terminal communicating with the space in cylinder 1—x above piston 2—x, and obtain similar results.

In Fig. 16, is shown an auxiliary operated valve, the main valve being of the type depicted in Figures 8 to 12, (i. e.: central feed) whilst the auxiliary-valve shown is that of Fig. 14. The arrangement of cylinder 1—x and bushing 16—x in the housing 11—x is substantially the same as that shown in Fig. 15; but a resistance-valve 18—x is shown, in substitution for the resistance cap 18—x, and the cylinder 1—x is shown seated directly in the lower end of the housing 11—x. The device is in operation and "arrows" indicate the flow of fluid. The auxiliary (or minor) discharge of fluid from feed-conduit 60 via conduit 49, auxiliary-resistance-valve 18—a, uniform-discharge-valve 3—x and conduit 52, to main discharge conduit 61 is maintained invariable by the valve 3—x, though the difference in pressure between conduits 60 and 61 may vary considerably. Again, resistance-valve 18—a being set at a predetermined opening, it follows that the loss in pressure in the fluid during passage therethrough is always the same, and that the fluid, in that part of the auxiliary-discharge system between resistance-valve 18—a and uniform-discharge-valve 3—x (e. g.: T-piece 54), will always indicate a pressure, lower, by a predetermined amount, than that in feed conduit 60 on the inlet side of the main resistance-valve 18—x. This intermediate portion of the auxiliary-discharge-system (i. e.: T-piece 54) communicates as freely as desired, via valve 53, with the space in the cylinder 1—x above the piston 2—x; and the fluid in the said space is thus maintained at a pressure, lower by an invariable and predetermined amount, than that present in conduit 60 at the inlet end of the main resistance-valve 18—x. Thus the combination of uniform-discharge-valve 3—x and resistance-valve 18—a, provides a pressure-reducing device for maintaining a predetermined and invariable effective pressure, operative downwardly upon the piston 2—x. Again the main discharge of fluid, as indicated, passes from feed-conduit 60 via main resistance valve 18—x (which is set at a predetermined opening), into the lower end of cylinder 1—x, and thence via axial chamber 13—x, radial ports 7—x and annular recess 6—x of piston 2—x and via radial ports 10—x of the cylinder, to chambers 21—x of the main housing, and thence via branch 11—y to the main discharge conduit 61. Increase of feed-pressure at 60 produces a momentary excessive discharge through main resistance-valve 18—x with a resultant momentary increase in the difference of pressure between the inlet and outlet ends thereof; but in the auxiliary circuit, owing to the action of uniform discharge valve 3—x no such reduction in difference of pressure, between the inlet and outlet ends of resistance-valve 18—a, occurs; and, since the pressures present at the inlet ends of the valves 18—x and 18—a are substantially equal, it follows that the pressure in the T-piece 54 operative downwardly on piston 2—*x* is momentarily in excess of the pressure, in the lower end of cylinder 1—*x*, operative upwardly on piston 2—*x*; and the said piston will thereupon descend under influence of the excess-pressure above it, closing the ports 10—*x*, and thus reducing the main discharge, until the difference of pressure between the inlet and outlet ends of main resistance valve 18—*x*, and the resultant discharge, are restored to their predetermined and original amount. The valve 53 is preferably provided to control to-and-fro displacements of fluid in the upper space of cylinder 1—*x*, by adjustment of the opening of this valve a steadying effect upon the movements of piston 2—*x* may be introduced under certain conditions. This valve 53 is also preferably provided in connection with the apparatus shown in Fig. 15, and is there inserted between the valve 3—*x* and the bushing 16—*x*.

Fig. 16—*a*, shows a rearrangement of the apparatus shown in Fig. 16, only as regards the piston 2—*x*, which in this Figure 16—*a*, is provided with the additional recess 8—*x* and radial ports 30—*x*, the functions of which have been described in connection with Fig. 8. The inclusion of recess 8—*x* and radial ports 30—*x*, under conditions in which excessive variations in the pressure of the controlled fluid occur, prevents resulting irregularities in the discharge as follows. It being assumed that the various elements of Fig. 16, are present, or in other words "that Fig. 16—*a* is superimposed upon Fig. 16;" the operative description, as applied previously to Fig. 16, applies equally here. In this case however because of the excessive variations in the pressure, considerable variations in the volume of the leak from the space above piston 2—*x* to the annular recess 15—*x* would obviously occur, in the absence of the recess 8—*x* and ports 30—*x*, resulting in variations in the discharge through auxiliary resistance valve 18—*a* and consequent variations in the difference in pressure between the inlet and outlet ends of the said valve; which, as previously explained, produce a parallel effect in respect of the main resistance valve 18—*x*. With the employment of recess 8—*x* and ports 30—*x* however, the aforementioned leak is substantially supplied from chamber 13—*x*, via ports 30—*x* and recess 8—*x*, and thus forms part of the discharge through main resistance-valve 18—*x*; and again since little or no leak occurs from the space above piston 2—*x*, it follows that little or no variation will be indicated in the pressure effective upon auxiliary resistance-valve 18—*a*; and thus uniform results will be obtained, in spite of excessive variations in the pressures controlled by the apparatus.

In reference again to Fig. 15; it is of advantage under certain conditions to construct the lower end of the piston with the additional recess 8, ports 30, and restricted vertical bore 30—*a* as shown in Fig. 1; in this construction the net discharge, including the leak from recess 15—*x*, takes place through the vertical bore 30—*a* in parallel with the annular leak-space around the ring 42; and provided the said radial ports offer a negligible resistance to the passage of the fluid therethrough, it will be clear that, that portion of the discharge through the said annular leak space, will take place under a pressure substantially equal to that under which the remainder of the discharge takes place through the said vertical port.

In reference to Figures 1, 8, 15, 16, 16—*a*, the dotted circle shown indicates one of the throttle-ports 10; whilst in reference to Fig. 9, the outline of one of the ports 10 coincides with the port indicated by the numeral 7.

Figures 4, 10, 12, 13, 14 and 14—*a* are provided primarily to show a special construction of the housing or arrangement of the feed and discharge system; and it should be understood that the various internal features of the cylinder 1 and the piston 2, (e. g.: the major throttle-ports 10 at different levels, the minor throttle-ports 17, the recess 8, the ports 30, etc.) as already described in detail, if omitted, are provided when necessary.

In reference again to Figs. 8 and 9; the radial cylinder ports 55, here shown, are preferably provided in all cases in which the arrangement of the major throttle ports 10 is such that at the limit of the opening-stroke of the piston 2 in respect of the said throttle-ports, free communication between recess 15 and the space outside cylinder 1 is not provided.

Referring again to Figures 1, 2, and 7; the annular projection (or ring) 40 may be reduced in diameter so as to provide a considerable clearance (or conductance) for the passage of the fluid around it and thus relieve the resistance orifices 14 of a part of their duty in this respect; also under certain conditions (e. g.: with the valve in an auxiliary capacity) the resistance-orifices 14 may be eliminated entirely and a predetermined annular clearance around ring 40 substituted therefor. The same obviously applies in relation to Figures 8 and 9, and in respect to the ring 42 there shown, and the resistance orifices 14 (and 14—*d* in Fig. 8).

I claim:

1. In an apparatus capable of producing a uniform discharge of fluid; a cylinder with radial ports for passage of the fluid; a piston arranged to reciprocate therein and control the exposure of the said ports; the piston having a chambered interior of predetermined bore, with an axial orifice formed in one end thereof, of a predetermined and lesser diameter than that of the said chambered interior, whilst the other end thereof is threadably adapted to receive a manually adjustable screw member which serves to provide whatever predetermined flow may be required; and the piston having an annular recess in its periphery adapted to communicate between the said chambered interior on the one hand and the said radial cylinder ports on the other, and pass the main discharge of fluid.

2. In an apparatus capable of producing a uniform discharge of fluid; a cylinder with ports for passing the said fluid; a piston arranged to reciprocate therein; axial means of passage through the interior of the piston and means of egress for the fluid therefrom, of a predetermined resistance, at one end thereof; the said means of passage communicating with the cylinder space at the other end thereof and being restricted in conductance area at this other end; a housing arranged to contain the said cylinder; a seating in the said housing for the cylinder; and spring means operative upon the said cylinder towards holding it upon the said seating in a fluid-tight manner.

3. In an apparatus capable of automatically producing a uniform discharge of fluid; a cylinder with radial ports for passage of the fluid; a piston arranged to reciprocate therein and regulate the closure of the said ports; the ports being of different areas, and so arranged, that the piston in its operation closes a port of smaller area last.

4. In an apparatus capable of automatically producing a uniform discharge of fluid; a cylinder with a piston arranged to reciprocate therein; a plate attached to one end of the cylinder and another plate attached to the other end thereof; a spring held in compression between one end of the piston and one of the plates; and interlocking means operative between the other plate and the other end of the piston; the said means embodying a pin and slot engagement.

5. In an apparatus capable of automatically producing a uniform discharge of fluid; a cylinder with ports for passing the said discharge; a piston arranged to reciprocate in the cylinder; the said piston having interior means of passage for the fluid; an annular recess in its periphery adapted to communicate with the said interior means on the one hand and with the said cylinder ports on the other; the said recess serving to pass the main discharge of fluid; a second recess formed in the piston and next the first recess; and a third recess formed in the piston, towards the same end thereof and beyond the said second recess; the said third recess having radial means of communication with the said interior means of passage.

FREDERICK RICHARD WEBB.